(12) United States Patent
Nakamoto et al.

(10) Patent No.: US 10,407,107 B2
(45) Date of Patent: Sep. 10, 2019

(54) FRONT PILLAR STRUCTURE

(71) Applicant: TOYOTA JIDOSHA KABUSHIKI KAISHA, Toyota-shi, Aichi-ken (JP)

(72) Inventors: Yoshiaki Nakamoto, Nisshin (JP); Naohiko Ueno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 15/834,480

(22) Filed: Dec. 7, 2017

(65) Prior Publication Data

US 2018/0170439 A1    Jun. 21, 2018

(30) Foreign Application Priority Data

Dec. 19, 2016 (JP) ................. 2016-246054

(51) Int. Cl.
*B62D 25/04* (2006.01)
*B62D 29/00* (2006.01)
*B62D 21/15* (2006.01)

(52) U.S. Cl.
CPC ............. *B62D 25/04* (2013.01); *B62D 21/15* (2013.01); *B62D 29/007* (2013.01)

(58) Field of Classification Search
CPC .............................. B62D 25/04; B62D 29/007
USPC ............................ 296/203.01–203.03, 193.06
See application file for complete search history.

(56) References Cited

U.S. PATENT DOCUMENTS

| | | | | |
|---|---|---|---|---|
| 5,586,799 A | * | 12/1996 | Kanemitsu | ........... B62D 25/081 296/187.01 |
| 6,209,950 B1 | * | 4/2001 | Hanyu | ................... B62D 25/04 296/203.02 |
| 6,447,052 B2 | * | 9/2002 | Saeki | ..................... B62D 21/15 296/187.09 |
| 6,702,368 B1 | * | 3/2004 | Hanyu | ................... B62D 25/04 296/193.05 |
| 9,260,137 B2 | * | 2/2016 | Honda | ................. B62D 29/002 |
| 2001/0020797 A1 | * | 9/2001 | Saeki | ..................... B62D 21/15 296/203.03 |
| 2007/0278828 A1 | * | 12/2007 | Anders | ................. B62D 25/04 296/193.06 |
| 2008/0211264 A1 | | 9/2008 | Riess et al. | |
| 2015/0115654 A1 | | 4/2015 | Honda | |
| 2015/0344071 A1 | | 12/2015 | Nakano et al. | |

FOREIGN PATENT DOCUMENTS

| | | |
|---|---|---|
| EP | 1 912 849 B1 | 2/2010 |
| JP | 2003-205859 A | 7/2003 |
| JP | 2011-037291 A | 2/2011 |
| JP | 2013-233838 A | 11/2013 |
| JP | 2015-229384 A | 12/2015 |
| JP | 5917409 B | 5/2016 |
| WO | 2011/071433 A1 | 6/2011 |

* cited by examiner

*Primary Examiner* — Dennis H Pedder
(74) *Attorney, Agent, or Firm* — Oliff PLC

(57) ABSTRACT

A front pillar structure includes a pillar outer. The pillar outer includes an outer side wall portion, a front side wall portion, a rear side wall portion, a rear side curved portion, and a front side curved portion. The outer side wall portion constitutes a part of the pillar outer on a side far from a vehicle width center in a width direction of a vehicle. The front side wall portion constitutes a part of the pillar outer on a front side of the vehicle. The rear side wall portion constitutes a part of the pillar outer on a rear side of the vehicle. The rear side curved portion connects the outer side wall portion and the rear side wall portion to each other. The front side curved portion connects the outer side wall portion and the front side wall portion to each other.

5 Claims, 6 Drawing Sheets

FRONT PILLAR STRUCTURE

INCORPORATION BY REFERENCE

The disclosure of Japanese Patent Application No. 2016-246054 filed on Dec. 19, 2016 including the specification, drawings and abstract is incorporated herein by reference in its entirety.

BACKGROUND

1. Technical Field

The present disclosure relates to a front pillar structure.

2. Description of Related Art

Japanese Unexamined Patent Application Publication No. 2011-37291 (JP 2011-37291 A) discloses an present disclosure related to a front pillar structure. In the front pillar structure, each of a front pillar outer portion and a pillar reinforcement lower has a hat-shaped cross section and is open inwards in the width direction of a vehicle, and the front pillar outer portion and the pillar reinforcement lower are joined to each other to constitute a front pillar lower that has an open cross-sectional structure and is open inwards in the width direction of the vehicle.

In addition, a flange portion on the front side of the vehicle and a front wall portion constituting the part of the pillar reinforcement lower that is on the front side of the vehicle are thick plate portions, and larger plate thicknesses are set in the thick plate portions than at the other parts of the pillar reinforcement lower. Accordingly, in the related art described in JP 2011-37291 A, a certain level of rigidity is ensured for a front pillar with respect to a load input to the front pillar via front wheels during a frontal collision of the vehicle.

SUMMARY

According to JP 2011-37291 A, however, the part of the front wall portion of the pillar reinforcement lower that is on the outer side in the width direction of the vehicle is reduced in plate thickness, and it is conceivable that deformation of the front pillar begins at the part once the load is input to the front pillar as a result of the frontal collision of the vehicle.

Conceivable in this regard is an increase in the plate thickness of the part of the front wall portion of the front pillar that is on the outer side in the width direction of the vehicle. Also conceivable is that the increase in the plate thickness is likely to result in an increase in the weight of the front pillar although it is likely to allow the rigidity of the front pillar to increase from that according to the above-described configuration. In other words, JP 2011-37291 A has room for improvement in that more rigidity has yet to be ensured for the front pillar with respect to the load input during the frontal collision of the vehicle and an increase in the weight of the front pillar has yet to be further suppressed.

The present disclosure provides a front pillar structure with which rigidity can be ensured for a front pillar with respect to a load input during a frontal collision of a vehicle and an increase in the weight of the front pillar can be further suppressed at the same time.

An aspect of the present disclosure relates to a front pillar structure including a pillar outer made of a high-tensile steel plate and constituting a part of a front pillar on a side far from a vehicle width center in a width direction of a vehicle.

The pillar outer includes an outer side wall portion, a front side wall portion, a rear side wall portion, a rear side curved portion, and a front side curved portion. The outer side wall portion constitutes a part of the pillar outer on the side far from the vehicle width center in the width direction of the vehicle. The outer side wall portion extends in an up-down direction of the vehicle and has the width direction of the vehicle as a plate thickness direction of the outer side wall portion. The front side wall portion constitutes a part of the pillar outer on a front side of the vehicle. The front side wall portion extends in the up-down direction of the vehicle and has a front-rear direction of the vehicle as a plate thickness direction of the front side wall portion. The rear side wall portion constitutes a part of the pillar outer on a rear side of the vehicle. The rear side wall portion extends in the up-down direction of the vehicle and has the front-rear direction of the vehicle as a plate thickness direction of the rear side wall portion. The rear side curved portion connects the outer side wall portion and the rear side wall portion to each other. The front side curved portion connects the outer side wall portion and the front side wall portion to each other. The front side curved portion is larger in plate thickness than the rear side curved portion.

According to the aspect of the present disclosure, the pillar outer made of the high-tensile steel plate constitutes the part of the front pillar on the side far from the vehicle width center in the width direction of the vehicle. The pillar outer is configured to include the outer side wall portion, the front side wall portion, and the rear side wall portion. The outer side wall portion constitutes the part of the pillar outer on the side far from the vehicle width center in the width direction of the vehicle. The outer side wall portion extends in the up-down direction of the vehicle and has the width direction of the vehicle as the plate thickness direction of the outer side wall portion. The front side wall portion constitutes the part of the pillar outer on the front side of the vehicle. The front side wall portion extends in the up-down direction of the vehicle and has the front-rear direction of the vehicle as the plate thickness direction of the front side wall portion. The rear side wall portion constitutes the part of the pillar outer on the rear side of the vehicle. The rear side wall portion extends in the up-down direction of the vehicle and has the front-rear direction of the vehicle as the plate thickness direction of the rear side wall portion. Accordingly, the parts of the pillar outer that the outer side wall portion, the front side wall portion, and the rear side wall portion constitute have a U-shaped configuration open to the side that is close to the vehicle width center in sectional view seen from the up-down direction of the vehicle.

During a frontal collision of the vehicle, a load is input via a front wheel to the part of the front pillar that is on the lower side of the vehicle. Then, the front pillar undergoes bending deformation, which causes its center of curvature to be positioned on the rear side of the front pillar. In other words, the amount of deformation of the part of the pillar outer that is on the front side of the vehicle exceeds the amount of deformation of the part of the pillar outer that is on the rear side of the vehicle. In addition, when the pillar outer configured as described above undergoes the bending deformation, stress concentration tends to occur at the boundary part between the outer side wall portion and the front side wall portion and at the boundary part between the outer side wall portion and the rear side wall portion. Accordingly, it is conceivable that the highest level of stress concentration in the pillar outer occurs at the boundary part between the outer side wall portion and the front side wall portion when the front pillar undergoes the bending deformation due to the load input during the frontal collision of the vehicle.

According to the aspect of the present disclosure, the front side curved portion connecting the outer side wall portion and the front side wall portion to each other is larger in plate thickness than the rear side curved portion connecting the outer side wall portion and the rear side wall portion to each other. Accordingly, the wall thickness of the part of the pillar outer where the amount of the deformation that is attributable to the load input during the frontal collision of the vehicle is relatively small can be further reduced, and the part of the pillar outer that undergoes the highest level of stress concentration due to the load can be reinforced to the same extent without an increase in the weight of the front pillar.

In the front pillar structure according to the aspect of the present disclosure, the outer side wall portion may have a plate thickness gradually decreasing from the front side of the vehicle toward the rear side of the vehicle.

According to the aspect of the present disclosure, the plate thickness of the outer side wall portion of the pillar outer can be set in accordance with the stress that is generated by the load input during the frontal collision of the vehicle. In addition, the occurrence of a stress concentration portion in the outer side wall portion can be further suppressed than in a configuration in which the plate thickness of the outer side wall portion undergoes a sudden change.

The front pillar structure according to the aspect of the present disclosure may further include a pillar inner constituting a part of the front pillar on a side close to the vehicle width center, a front side flange portion joined to the pillar inner and extending to the front side of the vehicle from a peripheral edge portion of the front side wall portion on the side close to the vehicle width center in the width direction of the vehicle, and a rear side flange portion joined to the pillar inner and extending to the rear side of the vehicle from a peripheral edge portion of the rear side wall portion on the side close to the vehicle width center in the width direction of the vehicle. The front side flange portion may be larger in plate thickness than the rear side flange portion.

According to the aspect of the present disclosure, the front side flange portion extends to the front side of the vehicle from the peripheral edge portion of the front side wall portion that is on the side close to the vehicle width center in the width direction of the vehicle, and the front side flange portion is joined to the pillar inner constituting the part of the front pillar that is on the side close to the vehicle width center. The rear side flange portion extends to the rear side of the vehicle from the peripheral edge portion of the rear side wall portion that is on the side close to the vehicle width center, and the rear side flange portion is joined to the pillar inner. Accordingly, the pillar outer and the pillar inner are capable of constituting a closed cross-sectional structural portion.

During the frontal collision of the vehicle, the amount of deformation of the part of the pillar outer that is on the front side of the vehicle exceeds the amount of deformation of the part of the pillar outer that is on the rear side of the vehicle as described above. Accordingly, the amount of deformation of the front side flange portion exceeds the amount of deformation of the rear side flange portion. It is conceivable that the state where the pillar outer and the pillar inner are joined to each other cannot be easily maintained once the amount of deformation of the front side flange portion exceeds the amount of deformation of the rear side flange portion.

According to the aspect of the present disclosure, the front side flange portion is larger in plate thickness than the rear side flange portion, and thus the deformation of the front side flange portion attributable to the load resulting from the frontal collision of the vehicle can be further suppressed. In addition, an increase in the weight of the pillar outer can be further suppressed by the plate thickness of the rear side flange portion that has a relatively small amount of deformation being further reduced.

In the front pillar structure according to the aspect of the present disclosure, each of the front side wall portion and the rear side wall portion may have a plate thickness gradually decreasing from the side far from the vehicle width center in the width direction of the vehicle toward the side close to the vehicle width center in the width direction of the vehicle.

According to the aspect of the present disclosure, the plate thicknesses of the front side wall portion and the rear side wall portion can be set in accordance with the stress that is generated by the load input during the frontal collision of the vehicle. In addition, the occurrence of a stress concentration portion in the front side wall portion and the rear side wall portion can be further suppressed than in a configuration in which the plate thicknesses of the front side wall portion and the rear side wall portion undergo a sudden change.

In the front pillar structure according to the aspect of the present disclosure, the outer side wall portion may be larger in plate thickness than the rear side wall portion and the front side wall portion may be larger in plate thickness than the outer side wall portion.

According to the aspect of the present disclosure, the plate thicknesses of the front side wall portion, the outer side wall portion, and the rear side wall portion can be set based on the stress that is generated by the load input during the frontal collision of the vehicle and the amount of the deformation that is attributable to the load.

In the front pillar structure according to the aspect of the present disclosure, each of the rear side curved portion and the front side curved portion may have a constant plate thickness when sections of the rear side curved portion and the front side curved portion perpendicular to the up-down direction of the vehicle are seen from the up-down direction of the vehicle.

According to the aspect of the present disclosure, the plate thicknesses of the rear side curved portion and the front side curved portion are constant when the sections of the rear side curved portion and the front side curved portion perpendicular to the up-down direction of the vehicle are seen from the up-down direction of the vehicle, and the occurrence of bias in the stress that is generated by the load input during the frontal collision of the vehicle can be further suppressed. In addition, the plate thicknesses of the rear side curved portion and the front side curved portion can be set with ease during a process for manufacturing the pillar outer.

According to the aspect of the present disclosure, rigidity can be ensured for the front pillar with respect to the load input during the frontal collision of the vehicle and an increase in the weight of the front pillar can be further suppressed at the same time as described above.

According to the aspect of the present disclosure, rigidity can be ensured for the outer side wall portion of the pillar outer with respect to the load input during the frontal collision of the vehicle and the weight of the outer side wall portion can be reduced at the same time.

According to the aspect of the present disclosure, excessive separation between the pillar outer and the pillar inner that is attributable to the load input during the frontal collision of the vehicle can be suppressed and an increase in the weight of the front pillar can be further suppressed at the same time.

According to the aspect of the present disclosure, rigidity can be ensured for the front side wall portion and the rear side wall portion of the pillar outer with respect to the load input during the frontal collision of the vehicle and the front side wall portion and the rear side wall portion of the pillar outer can be reduced in weight at the same time.

According to the aspect of the present disclosure, rigidity can be ensured for the front side wall portion, the outer side wall portion, and the rear side wall portion of the pillar outer with respect to the load input during the frontal collision of the vehicle and the plate thicknesses of the front side wall portion, the outer side wall portion, and the rear side wall portion of the pillar outer can be optimized at the same time.

According to the aspect of the present disclosure, rigidity can be ensured for the rear side curved portion and the front side curved portion of the pillar outer with respect to the load input during the frontal collision of the vehicle and the process for manufacturing the pillar outer can be simplified at the same time.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an example of an embodiment of a front pillar structure according to the present disclosure will be described with reference to FIGS. 1 to 3, and then a method for manufacturing a pillar outer that constitutes a part of a front pillar to which the front pillar structure is applied will be described with reference to FIGS. 4 to 6. The arrows FR, UP, and OUT that are appropriately illustrated in each of the drawings represent the front side of a vehicle, the upper side of the vehicle, and its side that is far from the vehicle width center in the width direction of the vehicle, respectively.

A schematic configuration of a vehicle body 12 of a "vehicle 10" to which the front pillar structure according to the present embodiment is applied will be described first with reference to FIG. 3. Basically, the vehicle body 12 according to the present embodiment has a bilaterally symmetrical configuration. Accordingly, the configuration of the left side part of the vehicle body 12 in the width direction of the vehicle will be mainly described below and the description of the configuration of its right side part in the width direction of the vehicle appropriately will be omitted.

The vehicle body 12 is configured to include a roof side rail (not illustrated) and a rocker (not illustrated). The roof side rail constitutes a part of the vehicle body 12 on the upper side of the vehicle and extends in the front-rear direction of the vehicle. The rocker constitutes a part of the vehicle body 12 on the lower side of the vehicle and extends in the front-rear direction of the vehicle. The part of the roof side rail that is on the front side of the vehicle and the part of the rocker that is on the front side of the vehicle are connected to each other in the up-down direction of the vehicle by a "front pillar 14" extending in the up-down direction of the vehicle. The front pillar 14 is configured to include a "pillar outer 16" and a pillar inner (not illustrated). The pillar outer 16 constitutes its part on the side that is far from the vehicle width center in the width direction of the vehicle. The pillar inner constitutes its part on the side that is close to the vehicle width center. A front wheel 18 is disposed in front of the front pillar 14. When seen from the front side of the vehicle, the front wheel 18 covers the part of the front pillar 14 that is on the lower side of the vehicle from the middle portion of the front pillar 14 in the up-down direction of the vehicle.

The present embodiment is characterized by a tailored blank constituting the pillar outer 16. The configuration of the front pillar 14 will be described in detail below and the following description will focus on the configuration of the pillar outer 16, which constitutes a main part of the present embodiment.

Figure 1:
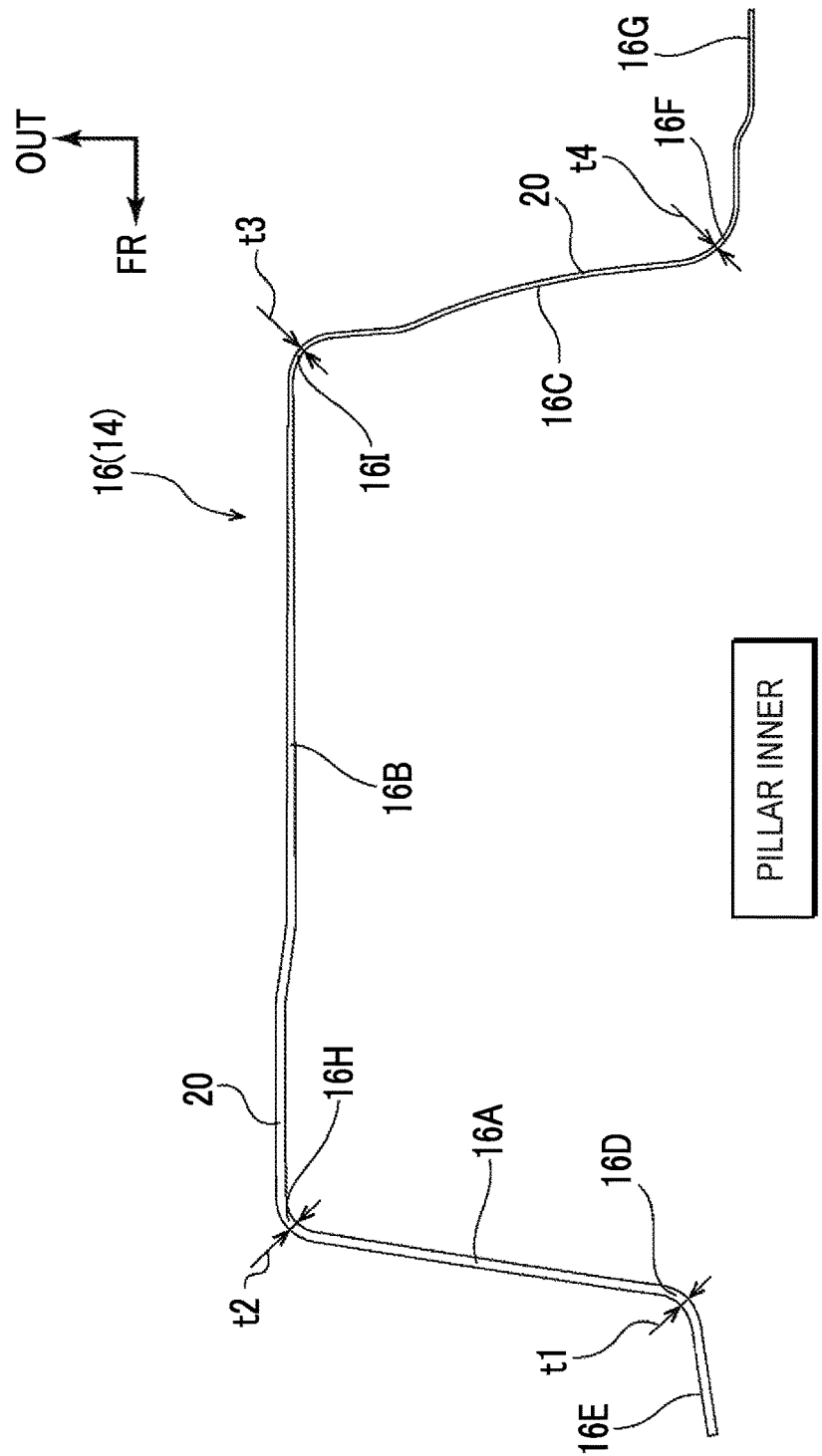
FIG. 1 is an enlarged cross-sectional view illustrating a configuration of a pillar outer of a front pillar to which a front pillar structure according to the present embodiment is applied (cross-sectional view illustrating a state where it is cut along line I-I of FIG. 3)
Figure 2A:
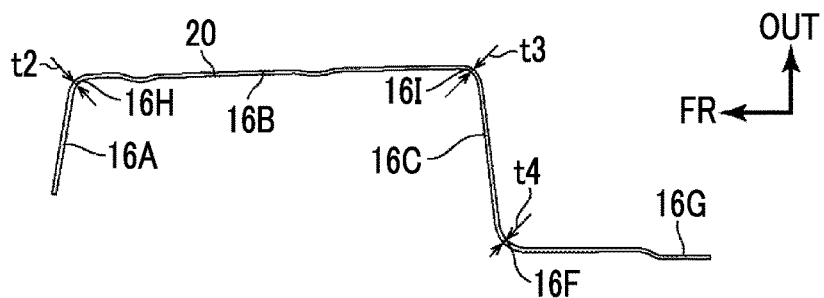
FIG. 2A illustrates the shape of the section that is on the uppermost side of a vehicle among the sections in a plurality of places of the pillar outer of the front pillar to which the front pillar structure according to the present embodiment is applied (state where it is cut along line IIA-IIA of FIG. 3)
Figure 2B:
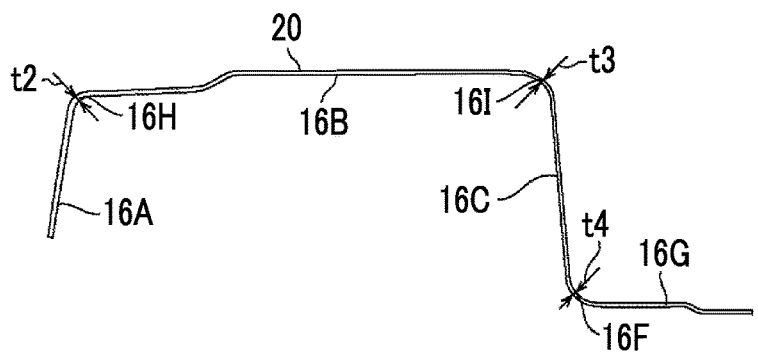
FIG. 2B illustrates the shape of the section that is below the section illustrated in FIG. 2A among the sections in the places of the pillar outer of the front pillar to which the front pillar structure according to the present embodiment is applied (state where it is cut along line IIB-IIB of FIG. 3)
Figure 2C:
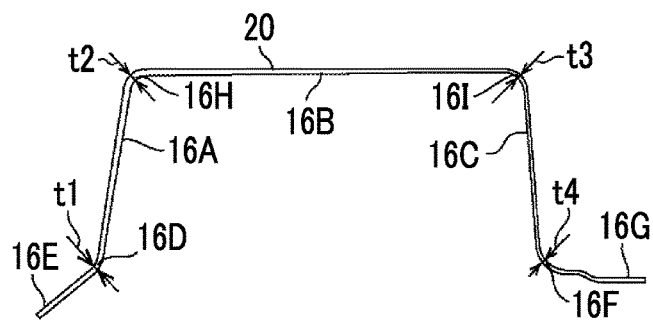
FIG. 2C illustrates the shape of the section that is below the section illustrated in FIG. 2B among the sections in the places of the pillar outer of the front pillar to which the front pillar structure according to the present embodiment is applied (state where it is cut along line IIC-IIC of FIG. 3)
Figure 2D:
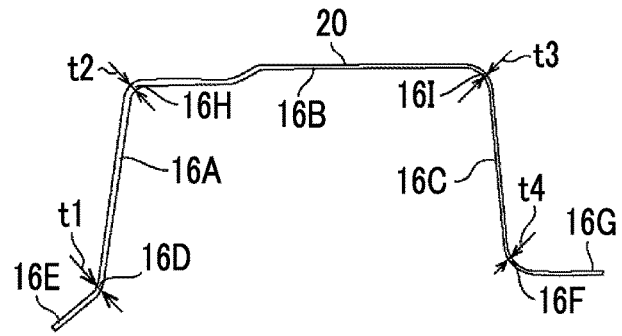
FIG. 2D illustrates the shape of the section that is below the section illustrated in FIG. 2C among the sections in the places of the pillar outer of the front pillar to which the front pillar structure according to the present embodiment is applied (state where it is cut along line IID-IID of FIG. 3)
Figure 3:
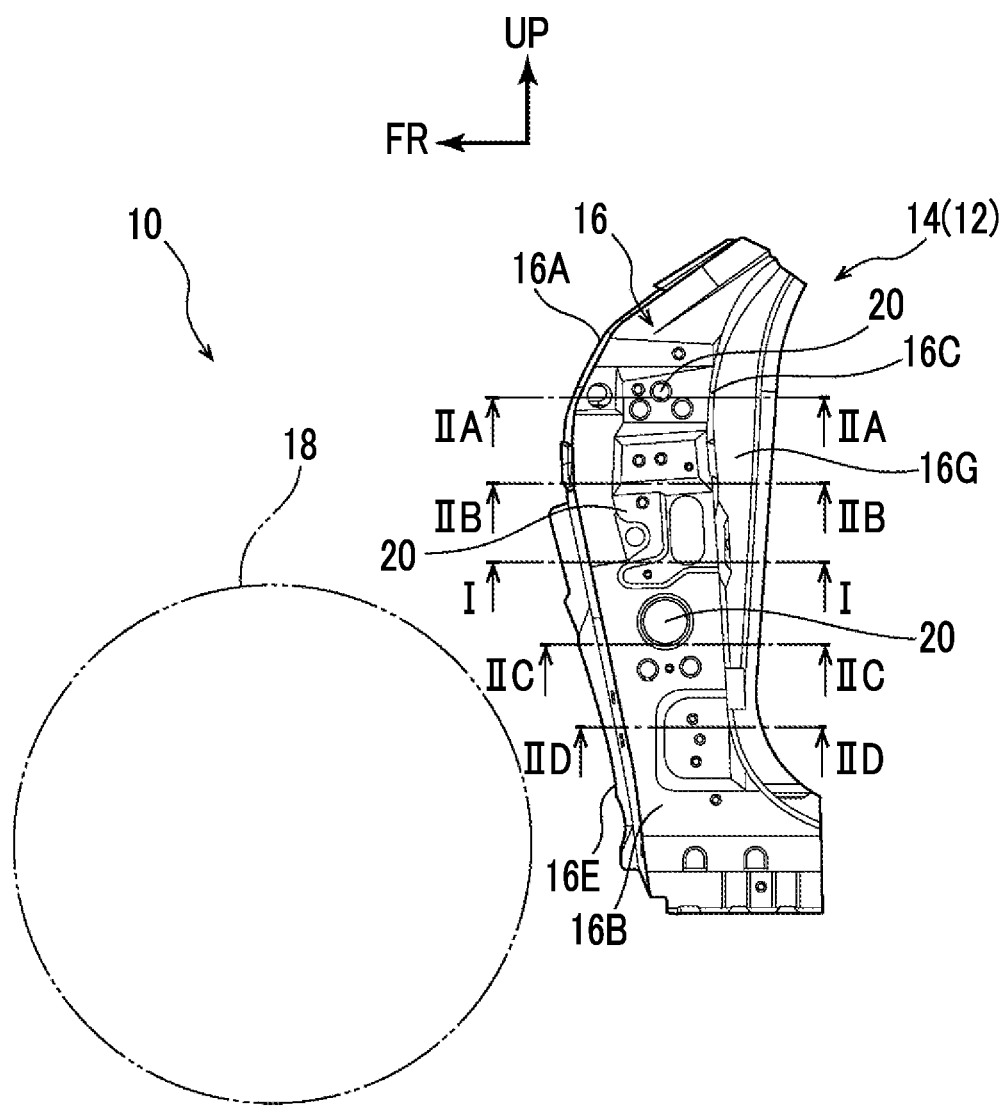
FIG. 3 is a side view illustrating a positional relationship between a front wheel of the vehicle and the front pillar to which the front pillar structure according to the present embodiment is applied and seen from the side that is far from the vehicle width center in the width direction of the vehicle.

As illustrated in FIGS. 1 and 3, the pillar outer 16 is configured to include a "front side wall portion 16A", an "outer side wall portion 16B", and a "rear side wall portion 16C". The front side wall portion 16A constitutes its part that is on the front side of the vehicle. The outer side wall portion 16B constitutes its part that is on the side far from the vehicle width center in the width direction of the vehicle. The rear side wall portion 16C constitutes its part that is on the rear side of the vehicle. A high-tensile steel plate that has a tensile strength of 1 [GPa] is an example of what constitutes the pillar outer 16.

The front side wall portion 16A has the shape of a plate extending in the up-down direction of the vehicle and having the front-rear direction of the vehicle as its plate thickness direction. When seen from the width direction of the vehicle, the front side wall portion 16A extends in the direction toward the upper front side of the vehicle from the lower rear side of the vehicle from its end portion on the lower side of the vehicle to its middle portion in the up-down direction of the vehicle. The part of the front side wall portion 16A that is on the upper side of the vehicle extends in the direction toward the upper rear side of the vehicle from the lower front side of the vehicle. The front side wall portion 16A has a curved shape at a position displaced by a predetermined distance from its middle portion in the up-down direction of the vehicle to the upper side of the vehicle.

A "front side flange portion 16E" extends to the front side of the vehicle via a curved portion 16D from the peripheral edge portion of the front side wall portion 16A that is on the side close to the vehicle width center. The front side flange portion 16E has the shape of a plate having the width direction of the vehicle as its plate thickness direction. Although the front side flange portion 16E is disposed along the front peripheral edge portion of the front side wall portion 16A with its disposition starting from the lower end portion of the peripheral edge portion as illustrated in FIGS. 2A to 2D as well, the front side flange portion 16E terminates at a position that is displaced by a predetermined distance to the upper side of the vehicle from the middle portion of the peripheral edge portion in the up-down direction of the vehicle. The section of the front side flange portion 16E that is seen from the up-down direction of the vehicle has a constant plate thickness.

The front side flange portion 16E is joined to the pillar inner by a joining portion (not illustrated) that is based on welding or the like. The pillar inner is disposed on the side of the pillar outer 16 that is close to the vehicle width center and extends in the up-down direction of the vehicle and the front-rear direction of the vehicle.

The curved portion 16D is interposed between the front side wall portion 16A and the front side flange portion 16E and connects the front side wall portion 16A and the front side flange portion 16E to each other. The curved portion 16D is curved such that it is along an arc convex to the inner rear side of the vehicle in sectional view seen from the up-down direction of the vehicle. The section of the curved portion 16D that is seen from the up-down direction of the vehicle has a constant plate thickness. The plate thickness of the front side flange portion 16E is set equal to the plate thickness of the curved portion 16D.

The rear side wall portion 16C has the shape of a plate extending in the up-down direction of the vehicle and having the front-rear direction of the vehicle as its plate thickness direction. When seen from the width direction of the vehicle, the rear side wall portion 16C linearly extends from its end portion on the lower side of the vehicle to a position displaced by a predetermined distance to the upper side of the vehicle from its middle portion in the up-down direction of the vehicle. The part of the rear side wall portion 16C that is on the upper side of the vehicle extends in the direction toward the upper rear side of the vehicle from the lower front side of the vehicle. The rear side wall portion 16C has a curved shape at a position displaced by a predetermined distance from its middle portion in the up-down direction of the vehicle to the upper side of the vehicle.

A "rear side flange portion 16G" extends to the rear side of the vehicle via a curved portion 16F from the peripheral edge portion of the rear side wall portion 16C that is on the side close to the vehicle width center. The rear side flange portion 16G has the shape of a plate having the width direction of the vehicle as its plate thickness direction. Basically, the rear side flange portion 16G is disposed along the entire peripheral edge portion of the rear side wall portion 16C that is on the rear side of the vehicle as illustrated in FIGS. 2A to 2D as well. The section of the rear side flange portion 16G that is seen from the up-down direction of the vehicle has a constant plate thickness. The rear side flange portion 16G is joined to the pillar inner as in the case of the front side flange portion 16E.

The curved portion 16F is interposed between the rear side wall portion 16C and the rear side flange portion 16G and connects the rear side wall portion 16C and the rear side flange portion 16G to each other. The curved portion 16F is curved such that it is along an arc convex to the inner front side of the vehicle in sectional view seen from the up-down direction of the vehicle. The section of the curved portion 16F that is seen from the up-down direction of the vehicle has a constant plate thickness. The plate thickness of the rear side flange portion 16G is set equal to the plate thickness of the curved portion 16F.

The outer side wall portion 16B extends in the up-down direction of the vehicle and has the width direction of the vehicle as its plate thickness direction. When seen from the width direction of the vehicle, the outer side wall portion 16B has the shape of a partially curved plate with its peripheral edge portion on the front side of the vehicle and its peripheral edge portion on the rear side of the vehicle corresponding to the shape of the front side wall portion 16A and the shape of the rear side wall portion 16C, respectively. A bead portion 20 is formed in a plurality of places in the front side wall portion 16A, the outer side wall portion 16B, and the rear side wall portion 16C.

The peripheral edge portion of the outer side wall portion 16B that is on the front side of the vehicle and the front side wall portion 16A are connected to each other via a "curved portion 16H" as a front side curved portion. The peripheral edge portion of the outer side wall portion 16B that is on the rear side of the vehicle and the rear side wall portion 16C are connected to each other via a "curved portion 16I" as a rear side curved portion.

The curved portion 16H is curved such that it is along an arc convex to the outer front side of the vehicle in sectional view seen from the up-down direction of the vehicle. The curved portion 16H has a section that has a constant plate thickness. The curved portion 16I is curved such that it is along an arc convex to the outer rear side of the vehicle in sectional view seen from the up-down direction of the vehicle. The curved portion 16I has a section that has a constant plate thickness.

The pillar outer 16 according to the present embodiment is formed by a tailor-rolled blank method as described later. As a result, each of the plate thicknesses of the front side wall portion 16A, the outer side wall portion 16B, and the rear side wall portion 16C gradually changes in longitudinal and short directions.

The distribution of the plate thickness of the section of the pillar outer 16 that is seen from the up-down direction of the vehicle will be described first with reference to the section of the middle portion of the pillar outer 16 in the up-down direction of the vehicle as an example. In the section, a plate thickness t1 of the front side flange portion 16E and the curved portion 16D is set to 1.8 [mm], a plate thickness t2 of the curved portion 16H is set to 2.0 [mm], a plate thickness t3 of the curved portion 16I is set to 1.0 [mm], and a plate thickness t4 of the rear side flange portion 16G and the curved portion 16F is set to 0.9 [mm] as illustrated in FIG. 1.

The plate thickness of the front side wall portion 16A gradually changes from 2.0 [mm] to 1.8 [mm] from the side that is far from the vehicle width center in the width direction of the vehicle toward the side that is close to the vehicle width center in the width direction of the vehicle. The plate thickness of the outer side wall portion 16B gradually changes from 2.0 [mm] to 1.0 [mm] from the front side of the vehicle toward the rear side of the vehicle. The plate thickness of the rear side wall portion 16C gradually changes from 1.0 [mm] to 0.9 [mm] from the side that is far from the vehicle width center in the width direction of the vehicle toward the side that is close to the vehicle width center in the width direction of the vehicle.

The distribution of the plate thickness of the section of the pillar outer 16 that is seen from the up-down direction of the vehicle has the same tendency as the section across the up-down direction of the pillar outer 16 although the value of the plate thickness varies with the exception of the rear side wall portion 16C. In other words, in the present embodiment, the plate thickness of the front side wall portion 16A gradually decreases from the side that is far from the vehicle width center in the width direction of the vehicle toward the side that is close to the vehicle width center in the width direction of the vehicle and the plate thickness of the outer side wall portion 16B gradually decreases from the front side of the vehicle toward the rear side of the vehicle. In addition, the front side flange portion 16E is larger in plate thickness than the rear side flange portion 16G. The distribution of the plate thickness of the rear side wall portion 16C will be described later.

Hereinafter, the distribution of the plate thickness of the pillar outer 16 in the up-down direction of the vehicle will be described with reference to FIGS. 2A to 2D. As illustrated in FIGS. 2A to 2D, the plate thickness t1 of the front side flange portion 16E and the curved portion 16D is constant at 1.8 [mm] (refer to FIGS. 2C and 2D). The plate thickness t2 of the curved portion 16H is set to 1.3 [mm] (refer to FIG. 2A), 1.8 [mm] (refer to FIG. 2B), 2.2 [mm] (refer to FIG. 2C), and 2.4 [mm] (refer to FIG. 2D) from the upper side of the vehicle and increases from the upper side of the vehicle toward the lower side of the vehicle. From the upper side of the vehicle toward the lower side of the vehicle, the plate thickness t3 of the curved portion 16I increases from 0.9 [mm] (refer to FIG. 2A) to 1.0 [mm] (refer to FIG. 2B) and then to 1.3 [mm] (refer to FIG. 2C) starting from the upper side of the vehicle. The plate thickness t3 of the curved portion 16I is constant at 1.3 [mm] (refer to FIG. 2D) at the part on the lower side of the vehicle. The plate thickness t4 of the rear side flange portion 16G and the curved portion 16F is constant at 1.3 [mm] (refer to FIGS. 2A and 2B) at the part on the upper side of the vehicle, decreases to 0.9 [mm] in the middle portion in the up-down direction of the vehicle as illustrated in FIG. 1, and increases to and becomes constant at 1.2 [mm] (refer to FIGS. 2C and 2D) at the part on the lower side of the vehicle.

The plate thickness of the pillar outer 16 in the up-down direction of the vehicle has the above-described distribution. As a result, the plate thickness of the section of the rear side wall portion 16C that is seen from the up-down direction of the vehicle gradually increases from the side that is far from the vehicle width center in the width direction of the vehicle toward the side that is close to the vehicle width center in the width direction of the vehicle at the part that is on the upper side of the vehicle. From the middle portion of the rear side wall portion 16C in the up-down direction of the vehicle to its part that is on the lower side of the vehicle, the plate thickness of the section that is seen from the up-down direction of the vehicle gradually decreases from the side that is far from the vehicle width center in the width direction of the vehicle toward the side that is close to the vehicle width center in the width direction of the vehicle.

The outer side wall portion 16B is larger in plate thickness than the rear side wall portion 16C, and the front side wall portion 16A is larger in plate thickness than the outer side wall portion 16B. The plate thicknesses of the front side wall portion 16A, the outer side wall portion 16B, and the rear side wall portion 16C described above refer to the average plate thicknesses of the front side wall portion 16A, the outer side wall portion 16B, and the rear side wall portion 16C, respectively. The plate thickness of each is the value (length) that is obtained by the area of the section being divided by the length of a line segment passing through the center of the plate thickness in the section seen from the up-down direction of the vehicle.

Hereinafter, the method for manufacturing the pillar outer 16 by the tailor-rolled blank method will be described with reference to FIGS. 4 to 6. The method for manufacturing the pillar outer 16 is broadly divided into a tailored blank manufacturing process and a heat treatment process.

The tailored blank manufacturing process will be described first. The tailored blank manufacturing process is divided into a cutting process and a rolling process. In the cutting process, a blank material B (plate to be rolled) illustrated in FIG. 4 is manufactured by a steel plate (metal plate) that has a constant plate thickness being cut into a predetermined shape (rectangular shape herein) by means such as press working. The shape of the blank material B is not limited to the rectangular shape. Any shape can be given to the blank material B.

In the rolling process that follows the cutting process, a tailored blank TB (refer to FIG. 5) is manufactured by the blank material B being rolled by a rolling mill. Specifically, a plurality of processes illustrated in FIGS. 4 to 6 (first to third processes herein) constitutes the rolling process, and the tailored blank TB is manufactured through the rolling processes in which the blank material B is rolled in a sequential manner by a plurality of (three herein) rolling mills 22, 24, 26. The rolling mills 22, 24, 26 are provided with a pair of work rolls 28, a pair of work rolls 30, and a pair of work rolls 32, respectively. Recessed portions 28A are formed in the outer peripheral surfaces of the work rolls 28. Recessed portions 30A are formed in the outer peripheral surfaces of the work rolls 30. Recessed portions 32A are formed in the outer peripheral surfaces of the work rolls 32.

The rolling mill 22 (refer to FIG. 4) that is used in the first process is provided with the work rolls 28, and the radius of each of the work rolls 28 changes in its circumferential direction. The recessed portion 28A is formed in the outer peripheral surface (processing surface) of each of the work rolls 28. The recessed portion 28A is formed at a circumferential part of the outer peripheral surface of the work roll 28 and is formed in a certain shape along the axial direction of the work roll 28.

The rolling mill 24 (refer to FIG. 5) that is used in the second process is provided with the work rolls 30, and the radius of each of the work rolls 30 changes in its axial direction. The recessed portion 30A is formed in the outer peripheral surface (processing surface) of each of the work rolls 30. The recessed portion 30A is formed in the middle portion of the outer peripheral surface of the work roll 30 in the axial direction and is formed in a certain shape along the circumferential direction of the work roll 30.

The rolling mill 26 (refer to FIG. 6) that is used in the third process is provided with the work rolls 32, and the radius of each of the work rolls 32 changes in its circumferential direction. The recessed portion 32A is formed in the outer peripheral surface (processing surface) of each of the work rolls 32. The recessed portion 32A is formed at a circumferential part of the outer peripheral surface of the work roll 32 and is formed in a certain shape along the axial direction of the work roll 32.

Figure 4:
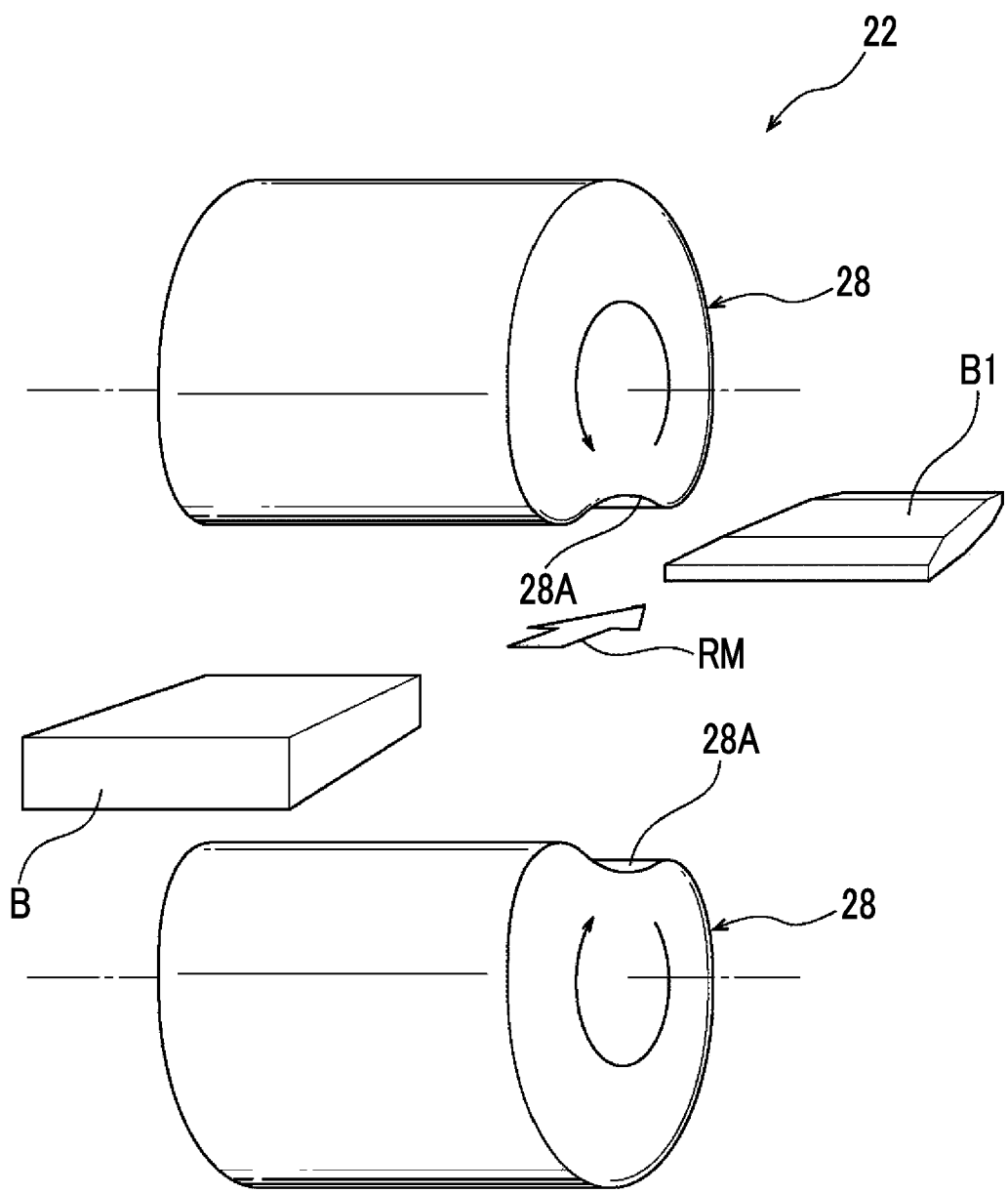
FIG. 4 is a perspective view for showing a first process of a rolling process constituting a method for manufacturing the pillar outer according to the present embodiment.
Figure 5:
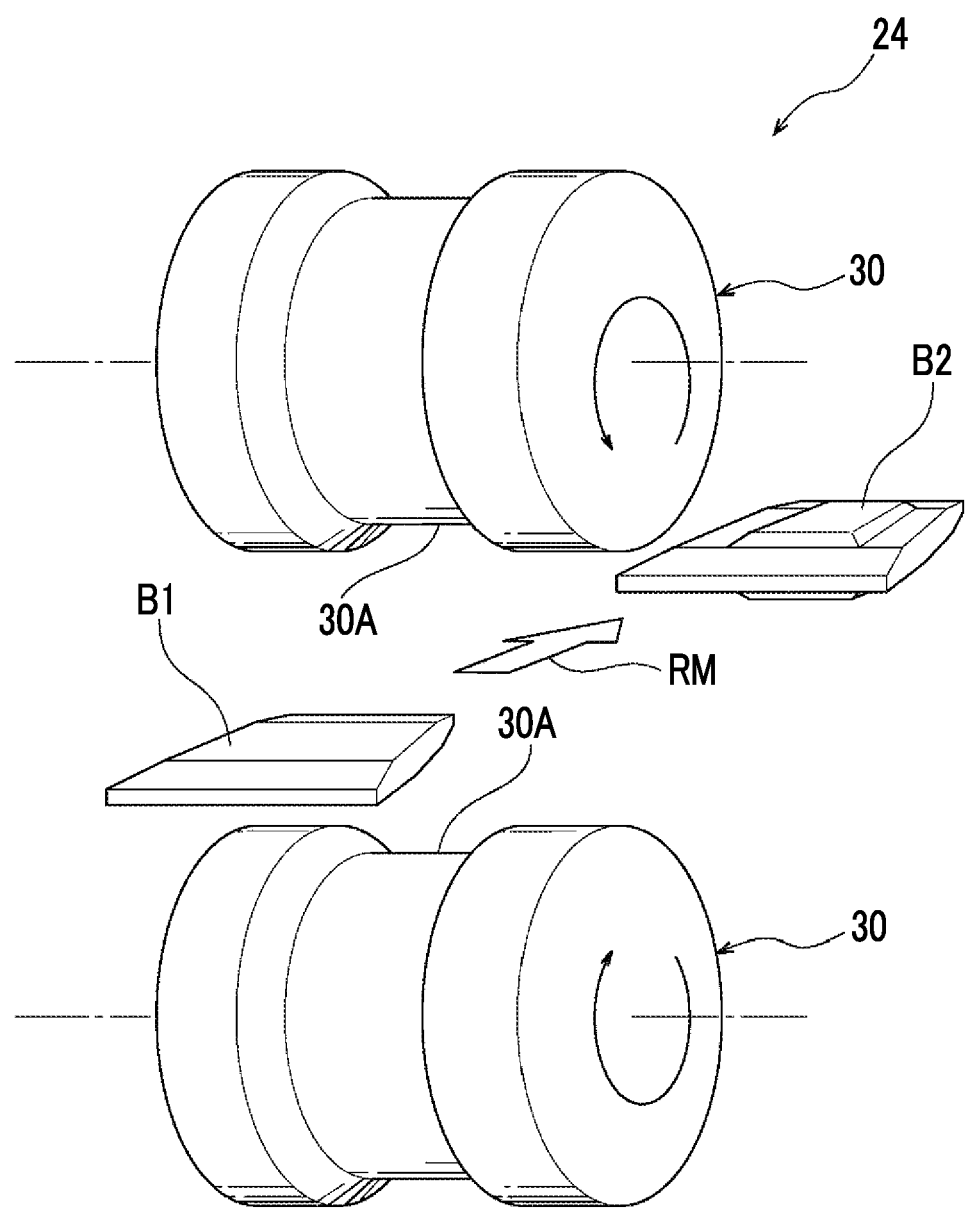
FIG. 5 is a perspective view for showing a second process of the rolling process constituting the method for manufacturing the pillar outer according to the present embodiment.

In the rolling processes in which the rolling mills 22, 24, 26 configured as described above are used, the blank material B is inserted and rolled first between the work rolls 28 of the rolling mill 22 in the first process illustrated in FIG. 4 (refer to arrow RM in FIG. 4). Then, the shapes of the processing surfaces of the work rolls 28 are transferred to the blank material B. In the subsequent second process illustrated in FIG. 5, a blank material B1 obtained as a result of the first process is inserted and rolled between the work rolls 30 of the rolling mill 24 (refer to arrow RM in FIG. 5) and the shapes of the processing surfaces of the work rolls 30 are transferred to the blank material B1.

Figure 6:
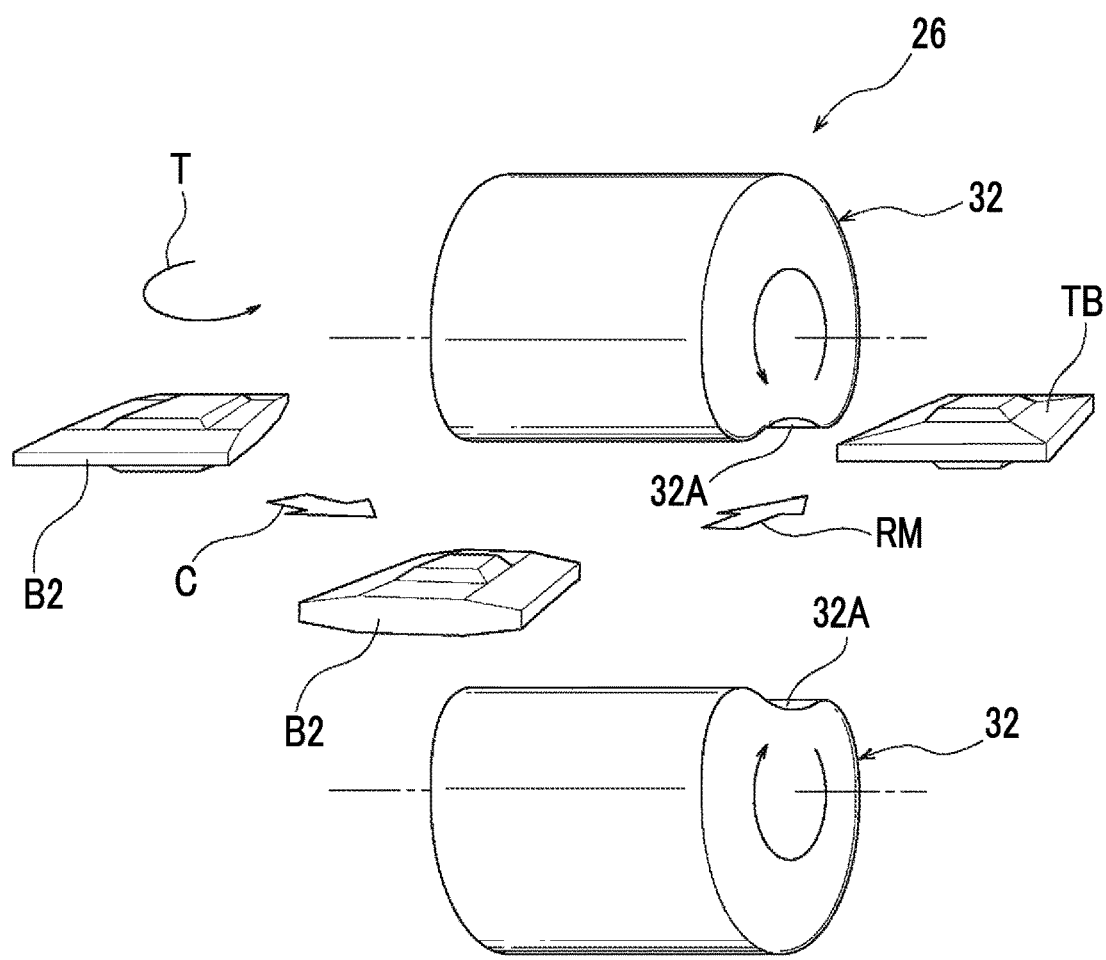
FIG. 6 is a perspective view for showing a third process of the rolling process constituting the method for manufacturing the pillar outer according to the present embodiment.

In the subsequent third process illustrated in FIG. 6, a blank material B2 obtained as a result of the second process is rotated first by 90 degrees in plan view (refer to arrow T in FIG. 6). Then, the blank material B is inserted and rolled between the work rolls 32 of the rolling mill 26 (refer to arrow C and arrow RM in FIG. 6). As a result, the tailored blank TB with a plate thickness changing in two different directions orthogonal to the plate thickness direction (refer to FIG. 6) is manufactured.

In other words, in the present embodiment, the plate thickness of each wall portion of the pillar outer 16 that gradually changes in the two different directions orthogonal to the plate thickness direction is broadly set in the first process and the third process. In the second process, the original shape of the bead portion 20 formed in the pillar outer 16 or the like is set.

In the heat treatment process, the pillar outer 16 is manufactured by the tailored blank TB manufactured as described above being bent in a hot pressing process and molded into a predetermined shape. In the hot pressing process, the tailored blank TB is heated to a predetermined temperature, by means such as high-frequency dielectric heating, before press working. During the heating, work hardening attributable to rolling processing (differential thickness processing) is removed.

Action and Effect of Present Embodiment

The action and effect of the present embodiment will be described below.

In the present embodiment, the pillar outer 16 made of the high-tensile steel plate constitutes the part of the front pillar 14 that is on the side far from the vehicle width center in the width direction of the vehicle. The pillar outer 16 is configured to include the outer side wall portion 16B, the front side wall portion 16A, and the rear side wall portion 16C. The outer side wall portion 16B constitutes the part of the pillar outer 16 that is on the side far from the vehicle width center in the width direction of the vehicle, extends in the up-down direction of the vehicle, and has the width direction of the vehicle as the plate thickness direction of the outer side wall portion. The front side wall portion 16A constitutes the part of the pillar outer 16 that is on the front side of the vehicle, extends in the up-down direction of the vehicle, and has the front-rear direction of the vehicle as the plate thickness direction of the front side wall portion. The rear side wall portion 16C constitutes the part of the pillar outer 16 that is on the rear side of the vehicle, extends in the up-down direction of the vehicle, and has the front-rear direction of the vehicle as the plate thickness direction of the rear side wall portion. Accordingly, the parts of the pillar outer 16 that the outer side wall portion 16B, the front side wall portion 16A, and the rear side wall portion 16C constitute have a U-shaped configuration open to the side close to the vehicle width center in sectional view seen from the up-down direction of the vehicle.

During a frontal collision of the vehicle 10, a load is input via the front wheel 18 to the part of the front pillar 14 that is on the lower side of the vehicle. Then, the front pillar 14 undergoes bending deformation, which causes its center of curvature to be positioned on the rear side of the front pillar 14. In other words, the amount of deformation of the part of the pillar outer 16 that is on the front side of the vehicle exceeds the amount of deformation of the part of the pillar outer 16 that is on the rear side of the vehicle. In addition, when the pillar outer 16 configured as described above undergoes the bending deformation, stress concentration tends to occur at the boundary part between the outer side wall portion 16B and the front side wall portion 16A and at the boundary part between the outer side wall portion 16B and the rear side wall portion 16C. Accordingly, it is conceivable that the highest level of stress concentration in the pillar outer 16 occurs at the boundary part between the outer side wall portion 16B and the front side wall portion 16A when the front pillar 14 undergoes the bending deformation due to the load input during the frontal collision of the vehicle 10.

In the present embodiment, the curved portion 16H connecting the outer side wall portion 16B and the front side wall portion 16A to each other is larger in plate thickness than the curved portion 16I connecting the outer side wall portion 16B and the rear side wall portion 16C to each other. Accordingly, the wall thickness of the part of the pillar outer 16 where the amount of the deformation that is attributable to the load input during the frontal collision of the vehicle 10 is relatively small can be further reduced, and the part of the pillar outer 16 that undergoes the highest level of stress concentration due to the load can be reinforced to the same extent without an increase in the weight of the front pillar 14. Accordingly, in the present embodiment, rigidity can be ensured for the front pillar 14 with respect to the load input during the frontal collision of the vehicle 10 and an increase in the weight of the front pillar 14 can be further suppressed at the same time.

In the present embodiment, the plate thickness of the outer side wall portion 16B of the pillar outer 16 gradually decreases from the front side of the vehicle toward the rear side of the vehicle, and the plate thickness of the outer side wall portion 16B can be set in accordance with the stress (set value) that is generated by the load input during the frontal collision of the vehicle 10. In addition, the occurrence of a stress concentration portion in the outer side wall portion 16B can be further suppressed than in a configuration in which the plate thickness of the outer side wall portion 16B undergoes a sudden change. Accordingly, in the present embodiment, rigidity can be ensured for the outer side wall portion 16B of the pillar outer 16 with respect to the load input during the frontal collision of the vehicle 10 and the weight of the outer side wall portion 16B can be reduced at the same time.

In the present embodiment, the front side flange portion 16E extends to the front side of the vehicle from the peripheral edge portion of the front side wall portion 16A that is on the side close to the vehicle width center in the width direction of the vehicle, and the front side flange portion 16E is joined to the pillar inner constituting the part of the front pillar 14 that is on the side close to the vehicle width center. The rear side flange portion 16G extends to the rear side of the vehicle from the peripheral edge portion of the rear side wall portion 16C that is on the side close to the vehicle width center, and the rear side flange portion 16G is joined to the pillar inner. Accordingly, the pillar outer 16 and the pillar inner are capable of constituting a closed cross-sectional structural portion.

During the frontal collision of the vehicle 10, the amount of deformation of the part of the pillar outer 16 that is on the front side of the vehicle exceeds the amount of deformation of the part of the pillar outer 16 that is on the rear side of the vehicle as described above. Accordingly, the amount of deformation of the front side flange portion 16E exceeds the amount of deformation of the rear side flange portion 16G. It is conceivable that the state where the pillar outer 16 and the pillar inner are joined to each other cannot be easily maintained once the amount of deformation of the front side flange portion 16E exceeds the amount of deformation of the rear side flange portion 16G.

In the present embodiment, the front side flange portion 16E is larger in plate thickness than the rear side flange portion 16G, and thus the deformation of the front side flange portion 16E attributable to the load resulting from the frontal collision of the vehicle 10 can be further suppressed. In addition, an increase in the weight of the pillar outer 16 can be further suppressed by the plate thickness of the rear side flange portion 16G that has a relatively small amount of deformation being further reduced. Accordingly, in the present embodiment, excessive separation between the pillar outer 16 and the pillar inner that is attributable to the load input during the frontal collision of the vehicle 10 can be suppressed and an increase in the weight of the front pillar 14 can be further suppressed at the same time.

In the present embodiment, the plate thicknesses of the front side wall portion 16A and the rear side wall portion 16C gradually decrease from the side that is far from the vehicle width center in the width direction of the vehicle toward the side that is close to the vehicle width center in the width direction of the vehicle. As a result, the plate thicknesses of the front side wall portion 16A and the rear side wall portion 16C can be set in accordance with the stress that is generated by the load input during the frontal collision of the vehicle 10. In addition, the occurrence of a stress concentration portion in the front side wall portion 16A and the rear side wall portion 16C can be further suppressed than in a configuration in which the plate thicknesses of the front side wall portion 16A and the rear side wall portion 16C undergo a sudden change. Accordingly, in the present embodiment, rigidity can be ensured for the front side wall portion 16A and the rear side wall portion 16C of the pillar outer 16 with respect to the load input during the frontal collision of the vehicle 10 and the front side wall portion 16A and the rear side wall portion 16C of the pillar outer 16 can be reduced in weight at the same time.

In the present embodiment, the outer side wall portion 16B is larger in plate thickness than the rear side wall portion 16C and the front side wall portion 16A is larger in plate thickness than the outer side wall portion 16B. Accordingly, the plate thicknesses of the front side wall portion 16A, the outer side wall portion 16B, and the rear side wall portion 16C can be set based on the stress that is generated by the load input during the frontal collision of the vehicle 10 and the amount of the deformation that is attributable to the load. Accordingly, in the present embodiment, rigidity can be ensured for the front side wall portion 16A, the outer side wall portion 16B, and the rear side wall portion 16C of the pillar outer 16 with respect to the load input during the frontal collision of the vehicle 10 and the plate thicknesses of the front side wall portion 16A, the outer side wall portion 16B, and the rear side wall portion 16C of the pillar outer 16 can be optimized at the same time.

In the present embodiment, the plate thicknesses of the curved portion 16I and the curved portion 16H are constant when the sections of the curved portion 16I and the curved portion 16H perpendicular to the up-down direction of the vehicle are seen from the up-down direction of the vehicle, and the occurrence of bias in the stress that is generated by the load input during the frontal collision of the vehicle 10 can be further suppressed. In addition, the plate thicknesses of the curved portion 16I and the curved portion 16H can be set with ease during the process for manufacturing the pillar outer 16. Accordingly, in the present embodiment, rigidity can be ensured for the curved portion 16I and the curved portion 16H of the pillar outer 16 with respect to the load input during the frontal collision of the vehicle 10 and the process for manufacturing the pillar outer 16 can be simplified at the same time.

Supplementary Description of Embodiment (1) According to the embodiment described above, each of the plate thicknesses of the front side wall portion 16A and the rear side wall portion 16C gradually changes in the longitudinal and short directions. However, each of the plate thicknesses may be set to a constant thickness as well. With the configuration described above, the process for manufacturing the pillar outer 16 can be simplified.

(2) According to the embodiment described above, each of the curved portion 16D, the front side flange portion 16E, the curved portion 16F, the rear side flange portion 16Q, the curved portion 16H, and the curved portion 16I has a constant plate thickness in sectional view seen from the up-down direction of the vehicle. However, the plate thickness may gradually change as well. With the configuration described above, the plate thickness of each part constituting the pillar outer 16 can be optimized.

(3) According to the embodiment described above, the pillar outer 16 is formed by the tailor-rolled blank method. However, the pillar outer 16 can also be formed by scraping or the like.

What is claimed is:

1. A front pillar structure comprising
a pillar outer made of a high-tensile steel plate and constituting a part of a front pillar on a far side of the front pillar relative to a vehicle width center in a width direction of a vehicle;
a pillar inner constituting a part of the front pillar on a near side of the front pillar relative to the vehicle width center;
a front side flange portion joined to the pillar inner; and
a rear side flange portion joined to the pillar inner, wherein:
the pillar outer includes an outer side wall portion, a front side wall portion, a rear side wall portion, a rear side curved portion, and a front side curved portion;
the outer side wall portion constitutes a part of the pillar outer on the far side from the vehicle width center in the width direction of the vehicle;

the outer side wall portion extends in an up-down direction of the vehicle and has the width direction of the vehicle as a plate thickness direction of the outer side wall portion;

the front side wall portion constitutes a part of the pillar outer on a front side of the vehicle;

the front side wall portion extends in the up-down direction of the vehicle and has a front-rear direction of the vehicle as a plate thickness direction of the front side wall portion;

the rear side wall portion constitutes a part of the pillar outer on a rear side of the vehicle;

the rear side wall portion extends in the up-down direction of the vehicle and has the front-rear direction of the vehicle as a plate thickness direction of the rear side wall portion;

the rear side curved portion connects the outer side wall portion and the rear side wall portion to each other;

the front side curved portion connects the outer side wall portion and the front side wall portion to each other;

the front side curved portion is larger in plate thickness than the rear side curved portion;

the front side flange portion extends to the front side of the vehicle from a peripheral edge portion of a near side of the front side wall portion relative to the vehicle width center in the width direction of the vehicle;

the rear side flange portion extends to the rear side of the vehicle from a peripheral edge portion of a near side of the rear side wall portion relative to the vehicle width center in the width direction of the vehicle; and the front side flange portion is larger in plate thickness than the rear side flange portion.

2. The front pillar structure according to claim 1, wherein the outer side wall portion has a plate thickness gradually decreasing from the front side of the vehicle toward the rear side of the vehicle.

3. The front pillar structure according to claim 1, wherein each of the front side wall portion and the rear side wall portion has a plate thickness gradually decreasing from the side far from the vehicle width center in the width direction of the vehicle toward the side near the vehicle width center in the width direction of the vehicle.

4. The front pillar structure according to claim 1, wherein:
an average plate thickness of the outer side wall portion is greater than an average plate thickness of the rear side wall portion; and
an average plate thickness of the front side wall portion is greater than the average plate thickness of the outer side wall portion.

5. The front pillar structure according to claim 1, wherein each of the rear side curved portion and the front side curved portion has a constant plate thickness when sections of the rear side curved portion and the front side curved portion perpendicular to the up-down direction of the vehicle are seen from the up-down direction of the vehicle.

* * * * *